Oct. 31, 1961 E. J. BEACH 3,006,614
CUPPED TYPE ROTOR AND VACUUM STUFFING BOX
Filed April 20, 1959 3 Sheets-Sheet 1

INVENTOR.
EDWARD J. BEACH
BY
*Zoltan Holczihy*
ATTORNEY

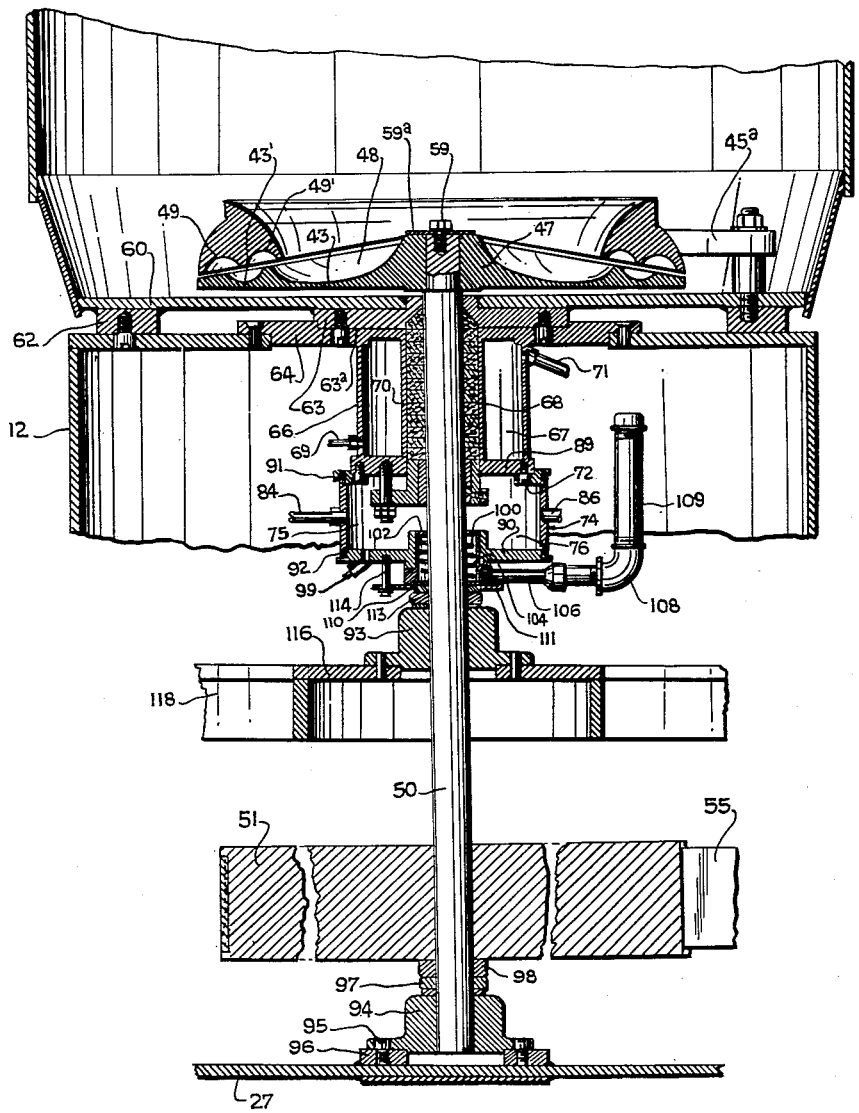

United States Patent Office 3,006,614
Patented Oct. 31, 1961

3,006,614
CUPPED TYPE ROTOR AND VACUUM STUFFING BOX
Edward J. Beach, Brooklyn, N.Y., assignor to Abbe Engineering Co., New York, N.Y., a corporation of New York
Filed Apr. 20, 1959, Ser. No. 807,627
3 Claims. (Cl. 259—104)

This invention relates to the art of mixing devices particularly those adapted for mixing, milling and blending of pastes and other mixes of heavy consistency.

According to the invention there is provided a device employing a cupped rotor and stator for effecting milling and a double rotating paddle assembly for circulating the mix. A vacuum is maintained in the mixing chamber in which the rotor, stator and paddle operate. The rotor is turned by a shaft which is mounted between bearings and journaled in a water jacketed stuffing box. A vacuum chamber is associated with the stuffing box. The same reduced air pressure is maintained in the mixing chamber and the stuffing box vacuum chamber.

It is a principal object of the invention to provide a mixing apparatus in which a mixing chamber is maintained under reduced air pressure or vacuum, and in which a milling element is rotated by a shaft journaled in a water cooled stuffing box and passing through a housing maintained under reduced air pressure or vacuum.

Another object is the provision of a mixing apparatus having a mixing chamber in which a cupped rotor and stator are employed as milling elements and double paddles are employed as circulating elements, the chamber being maintained under vacuum, and the rotor being turned by a shaft journaled in a water cooled stuffing box and vacuum housing.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 5 is a longitudinal sectional view through the drive shaft and lower portion of the mixing tank.

Figure 1:
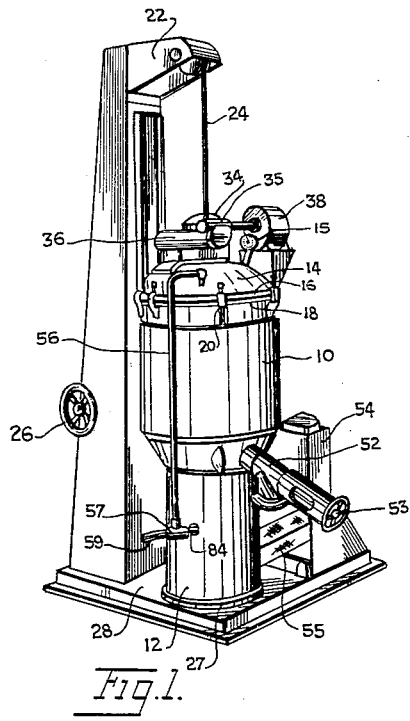
FIG. 1 is a perspective view of a mixing device embodying the invention.
Figure 2:
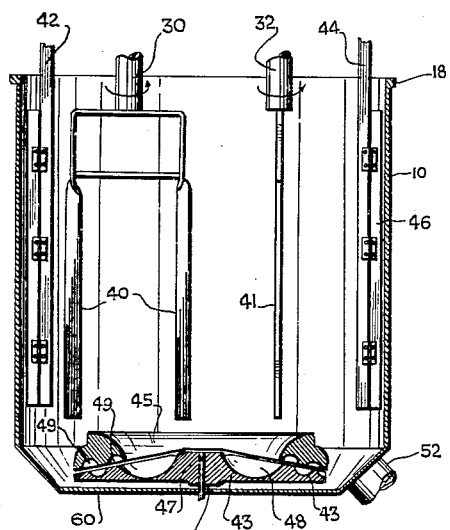
FIG. 2 is a sectional view of the mixing chamber or mixing tank of the device.

Referring to the drawings, there is shown in FIG. 1 a mixing apparatus including a mixing tank 10 supported on a cylindrical stand 12. The tank has an open top over which is removably mounted a dome-like cover 14. The cover and tank are provided with flanges 16, 18 which are held in abutment by clamps 20. A hoist 22 is provided for lifting the cover off the tank. A cable 24 controlled by a handwheel 26 operates the hoist. The stand 12 has a bottom plate 27 mounted on a base plate 28. Shafts 30 and 32, best shown in FIG. 2, are journaled for rotation in a gear housing 34 containing gears which are driven via a speed reducing gear train 35, 36 by a motor 38. The shafts 30 and 32 rotate a double paddle assembly consisting of two pairs of paddles 40, 41. Each pair of paddles is disposed in a vertical plane and it rotates on shaft 30 or 32 on an axis while the shaft is revolved in a horizontal plane by the planetary gearing in housing 34. Bars 42, 44 are also rotated by the gearing. These bars extend vertically into the tank 10 and serve to scrape the sides of the tank by means of scraper blades 46.

Figure 3:
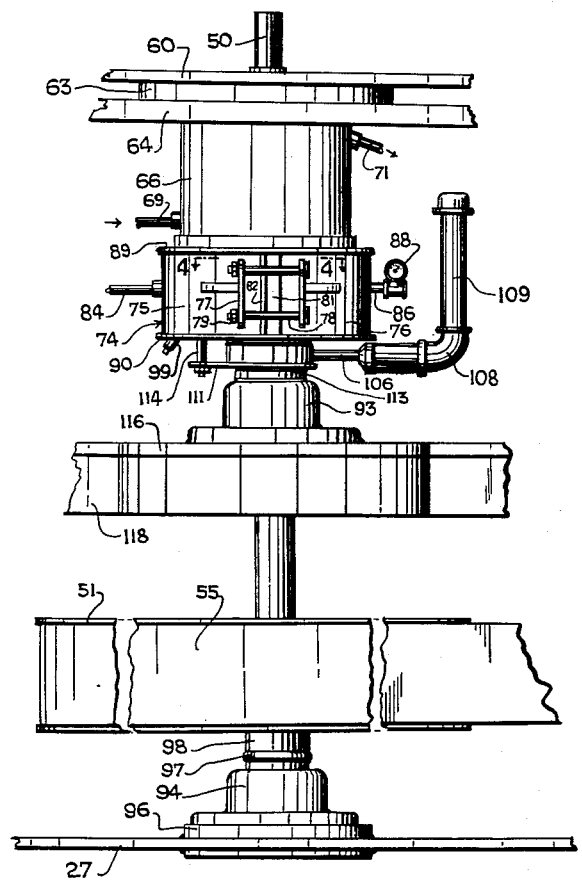
FIG. 3 is an elevational view of a portion of the device showing details of the drive shaft, bearings and stuffing box, parts being broken away.

A stator 45 is secured to the tank near the bottom thereof by brackets 45a, as best shown in FIG. 5. Underneath the stator is a rotor 47 having cupped portions 43, 43' separated by vanes 48. Stator 45 also has cupped portions 49, 49' separated by vanes. The stator and rotor serve as milling elements for the ingredients of the mixture to be placed in the tank. The rotor is driven by a drive shaft 50 which is vertically disposed and passes through the bottom 60 of the tank. At the bottom of the tank is an outlet pipe 52 controlled by a valve 53 for drawing off the mix from the tank. The shaft 50 is driven by a motor contained in motor housing 54 and having a belt 55 operatively connected to the shaft as will be described. A vacuum line 56 is connected to a fitting on the cover 14. This line, as best shown in FIGS. 3 and 5, terminates at a T-fitting 57. Line 59 is connected between fitting 57 and a vacuum pump (not shown). A pressure gauge 15 is connected to cover 14.

Figure 4:
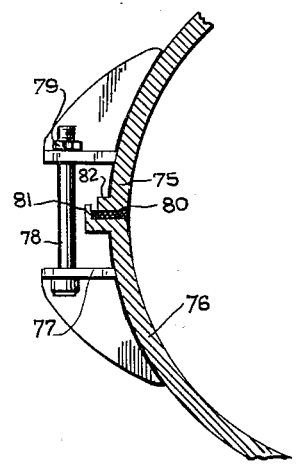
FIG. 4 is a sectional view on an enlarged scale taken on line 4—4 of FIG. 3 showing assembly details of the vacuum housing associated with the stuffing box of the drive shaft.

Referring to FIGS. 3 and 5, it will be noted that the shaft 50 supports rotor 47 which is secured to the top of the shaft by a bolt 59 and plate 59a. The shaft passes through the bottom 60 of tank 10. The tank is supported on a spacer ring 62 and a central spacer plate 63. The spacer plate is secured to the bottom of the tank. Plate 63 fits into a recess 63a in an annular extension of top 64 of a water cooled jacketed stuffing box 66. This box is cylindrical in form and has an inner cylindrical shell 68 within which is a packing 70. Between shell 68 and the outer wall of the box 66 is a chamber 67 through which water flows from an inlet 69 to an outlet 71. Secured to the bottom of the box 66 by bolts 72 is a vacuum housing 74. This housing is formed by two semi-cylindrical plates 75, 76 joined together by two pairs of bolts 78 best shown in FIGS. 3 and 4.

Radially extending flanges 77 support the bolts 78 which are engaged by nuts 79. The abutting edges of plates 75, 76 are spaced by gaskets 80 disposed between overlapping flanges 81 and 82. To T-fitting 57 is connected pipe 84 which terminates in an opening in the wall of the housing 74. An opening is provided in housing 74 for connection of a vacuum gauge 88 via nipple 86. The housing 74 has top and bottom plates 89, 90 sealed by ring gaskets 91, 92.

The shaft rotates in a top bearing 93 and a bottom bearing 94. Between the bearings on shaft 50 is secured a sheave 51 on which is engaged the belt 55. The bottom bearing 94 is secured to base plate 28 by bolts 95. Bearing 94 is supported on a spacer ring 96. Collars 97, 98 space the sheave 51 and bearing 94. A plug 99 is provided in plate 90 for draining and lubricant or other fluid which may enter the housing 74. The bottom of the housing 74 is sealed by a sealing ring 100 located in a reentrant well 102 and biased upwardly by a spring 104. The well 102 is cooled by water which circulates around the shaft passing through the well. A pipe 106 connected to an elbow fitting 108 and an upstanding filler pipe 109 is provided for filling the well with water. The well closed by a lower ring 110 and sealing ring 111, is secured to plate 90 by bolts 114. The top bearing 93 is supported on a plate 116 integral with a rigid bar 118 attached to diametrally opposed sides of stand 12. The bearing is spaced by collar 113 from ring 110.

In operation of the apparatus, the cover is elevated by means of hoist 22 and is filled with the ingredients to be milled and mixed. The apparatus is adapted for mixing paints, toothpaste, paper coatings and other pasty, heavy consistency fluids. The double paddles circulate the fluid while the rotary and stationary cupped milling elements 45, 47 eliminate lumps and bubbles. The mixing chamber is kept under a reduced air pressure or vacuum via vacuum line 56. Gauge 15 indicates the pressure in the chamber. The housing 74 which is kept under reduced pressure via vacuum line 84 prevents leakage of air past the packing 70 into the mixing chamber. The housing 74 thus provides a buffer vacuum chamber. The water which flows into chamber 67 via pipe 69 keeps the packing cool. The spring biased seal provided by spring 104 and ring 100 in well 102 maintains the vacuum in housing 74. The packing 70 of the stuffing box prevents leakage of the contents of the tank down the shaft.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A mixing apparatus, comprising a closed tank having a removable cover and a bottom, means for establishing a vacuum in the tank, paddles rotatably supported in the tank for circulating the contents thereof, a stationary milling element supported near the bottom of the tank, a rotatable milling element supported for rotation adjacent the stationary milling element, a drive shaft extending through the bottom of the tank, a pair of spaced bearings, said shaft being rotatable in said bearings, a stuffing box with packing, sealing the tank against leakage, means for cooling the packing in the stuffing box by means of circulating liquid, means for maintaining the packing of the stuffing box under vacuum to prevent air from reaching the tank via the stuffing box, the last-named means including a cylindrical housing, said housing being formed by a pair of semicylindrical plates, said plates having edges disposed in abutment with gaskets therebetween, clamping means securing the plates together, means for creating a vacuum in said housing, said housing having a bottom formed with a reentrant well, means for supplying water to said well, a sealing ring movably seated in the well, and spring means in the well holding the sealing ring seated in the well and sealing the housing to maintain the vacuum therein.

2. A mixing apparatus, comprising a closed tank having a removable cover and bottom, means for establishing a vacuum in the tank, paddles rotatably supported in the tank for circulating the contents thereof, means for rotating said paddles, a stationary milling element supported near the bottom of the tank, a rotatable milling element supported for rotation adjacent the stationary milling element, a drive shaft extending through the bottom of the tank for rotating said rotatable element, a pair of spaced bearings, said shaft being rotatable in said bearings, a stuffing box with packing sealing the tank against leakage, means for cooling the packing in the stuffing box by means of circulating liquid, means for maintaining the packing of the stuffing box under vacuum to prevent air from reaching the tank via the stuffing box, the last-named means comprising a cylindrical housing, said housing being formed by a pair of semicylindrical plates, said plates having edges disposed in abutment with gaskets therebetween, clamping means securing the plates together, said housing having a bottom formed with a reentrant well, means for supplying water to said well, a sealing ring movably seated in the well, and spring means in the well holding the sealing ring seated in the well and sealing the housing to maintain the vacuum therein, there being a common source of vacuum connected to said closed tank and said housing, said source including a first pipe connected to said cover and opening into the closed tank, a second pipe connected to and opening into said housing, a fitting, said first and second pipes being connected to said fitting, and a third pipe connected to said fitting for establishing the vacuum in the closed tank and housing via the first and second pipes.

3. A mixing apparatus comprising a flat base, a hollow cylindrical stand on said base, said stand having a closed top with a central opening therein, a hollow cylindrical tank having a closed bottom supported on the closed top of said stand, said bottom having an opening aligned with the opening in the stand, a removable cover on said tank, paddles rotatably mounted in the tank, means for rotating said paddles, a rotatable shaft extending through said bottom and said aligned openings, a rotor on the end of the shaft inside said tank and adjacent the closed bottom thereof, a stator in the tank coacting with said rotor, a stuffing box in said stand through which said shaft extends, packing in said stuffing box around said shaft, a chamber around said stuffing box, means for creating a vacuum in said chamber, a second chamber around said shaft in the stand, means for supplying cooling water to said second chamber, to keep the shaft and packing cool, a reentrant well around said shaft partially inside the second chamber, and means for supplying water to said well for cooling said shaft.

References Cited in the file of this patent

UNITED STATES PATENTS

| | | |
|---|---|---|
| 955,463 | Jones | Apr. 19, 1910 |
| 1,772,898 | Jensen | Aug. 12, 1930 |
| 2,387,024 | Hishon et al. | Oct. 16, 1945 |
| 2,468,389 | Aver | Apr. 26, 1949 |
| 2,525,800 | Heineman | Oct. 17, 1950 |
| 2,858,083 | Shurts | Oct. 28, 1958 |
| 2,865,615 | Slaughter | Dec. 23, 1958 |
| 2,867,419 | Heinzerling | Jan. 6, 1959 |